US006917856B2

(12) United States Patent
Murata

(10) Patent No.: US 6,917,856 B2
(45) Date of Patent: Jul. 12, 2005

(54) ROBOT

(75) Inventor: Kenji Murata, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 141 days.

(21) Appl. No.: 10/343,913

(22) PCT Filed: Apr. 12, 2002

(86) PCT No.: PCT/JP02/03679

§ 371 (c)(1),
(2), (4) Date: Feb. 6, 2003

(87) PCT Pub. No.: WO03/086718

PCT Pub. Date: Oct. 23, 2003

(65) Prior Publication Data

US 2003/0192758 A1 Oct. 16, 2003

(51) Int. Cl.⁷ .......................... G05B 19/04; G05B 19/18
(52) U.S. Cl. .................. 700/255; 700/165; 700/245; 318/560; 318/568.11; 361/71; 361/72; 361/73; 361/74; 361/75; 361/382; 901/3
(58) Field of Search ............................ 700/245, 255, 700/165; 318/560, 568.11, 568.12, 568.18, 568.21, 569; 701/23; 188/382; 361/383, 71–75; 901/3

(56) References Cited

U.S. PATENT DOCUMENTS 5,969,973 A * 10/1999 Bourne et al. .............. 700/165
6,166,504 A * 12/2000 Iida et al. .................... 318/560
6,356,806 B1 * 3/2002 Grob et al. .................. 700/245

FOREIGN PATENT DOCUMENTS

| JP | 7-104811 A | 4/1995 |
| JP | 10-151596 | 6/1998 |
| JP | 11-179691 | 7/1999 |
| JP | 11-179691 A | 7/1999 |
| JP | 3003768 | 11/1999 |
| JP | 2000-47732 | 2/2000 |

* cited by examiner

Primary Examiner—Thomas G. Black
Assistant Examiner—McDieunel Marc
(74) Attorney, Agent, or Firm—Sughrue Mion, PLLC

(57) ABSTRACT

It is constructed so as to detect a joint movement position of a robot arm by a position detector and a joint movement speed is calculated from change amounts of the joint movement position and elapsed time and is compared with an allowable movement speed and unlocking and locking of a brake are controlled so that the joint movement speed of an arm at the time of brake unlocking becomes within a constant value even when a shape, an attitude and a load condition of the robot arm vary. Therefore, movement work of the arm by the brake unlocking can be performed alone and a robot with high safety can be obtained.

11 Claims, 18 Drawing Sheets

| X1 | UNLOCKING TIME | LOCKING TIME |
|---|---|---|
| A1~B1 | $T_{BR1}$ | $T_{BL1}$ |
| B1~C1 | $T_{BR2}$ | $T_{BL2}$ |
| C1~D1 | $T_{BR3}$ | $T_{BL3}$ |
| D1~E1 | $T_{BR4}$ | $T_{BL4}$ |
| E1~F1 | $T_{BR5}$ | $T_{BL5}$ |

ROBOT

TECHNICAL FIELD

This invention relates to an improvement in a control apparatus of a robot for shifting a servo system to a control stop state and unlocking a brake of a robot arm.

BACKGROUND ART

A robot has built a firm position as an apparatus for conveyance or assembly for savings in labor and person, and has been frequently used in the field of manufacturing industries such as an automobile industry, an electrical appliance industry or a semiconductor industry. Particularly, a technique of brake unlocking is effective in reducing packing volume by moving an arm of a robot to an attitude at the time of conveyance, and also is effective in a return operation of the case that control became impossible by movement beyond a stroke, and is a basic technique of the robot.

FIG. 16 is a block diagram of a conventional industrial robot control apparatus for unlocking a brake and being shown in JP-A-11-179691, and FIG. 17 is a flowchart of brake control, and FIG. 18 is a state diagram showing a brake action.

A configuration will be described below. In the drawings, numeral 1 is a robot body which has a set of a motor 11, a position detector 12 and a brake 13 per one joint. Numeral 2 is a control apparatus which drives and controls the robot body 1 by an action program, and has a central processing unit 21, a servo control part 23, a servo amplifier part 24, a brake control part 25 and a brake driving part 26. Numeral 3 is a manual operation apparatus and an operator gives a command necessary for robot control.

The central processing unit 21 in the control apparatus 2 is a part for generating commands of position control or various functions of the robot body 1 based on a control program. The servo control part 23, the servo amplifier part 24 and the motor 11 form a servo control system. At the time of control of a servo system, a command about movement or stop is given to the servo control part 23 and its command is further passed to the servo amplifier part 24 and turning force for driving a robot arm (not shown) is finally generated in the motor 11 and when a movement command is not given, the turning force balances with its own weight of the robot arm to make a stop. Also, when the movement command is given, it is constructed so that turning force larger than force for offsetting its own weight of the robot arm is generated and the robot arm moves.

Also, the position detector 12 is mounted in the motor 11. The position detector 12 recognizes a servo control position of the robot arm, and is actually constructed so that a rotational angle of the motor 11 is detected and an output signal of the rotational angle is fed back to the servo control part 23 and the servo amplifier part 24 and as a result of that, the robot arm always maintains a position command value from the operation part 3. The brake 13 is mounted integrally with a shaft of the motor 11 or between the shaft and the robot arm. Numeral 27 is a brake unlocking time setting part, and numeral 28 is a brake locking time setting part. The brake unlocking time setting part 27 and the brake locking time setting part 28 are constructed so as to be allocated to memory (not shown) of the central processing unit 21 as parameters of the robot control apparatus and be able to be changed from the manual operation apparatus 3 etc. by an operator. The brake driving part 26 performs driving so as to unlock or lock the brake 13 actually by an output signal from the brake control part 25. It is constructed so that an unlocking command of the brake 13 is generated by pushing an unlocking operation switch (not shown) present in the manual operation apparatus 3.

Next, an action will be described. First, the central processing unit 21 decides a working state of an unlocking operation switch of the manual operation apparatus 3 in step S71. When the unlocking operation switch of a brake unlocking command is "ON", the action proceeds to step S72 and the central processing unit 21 performs control stop processing of a servo system. That is, a locking action of the brake 13 is performed and a signal output to the servo control part 23, the servo amplifier part 24 and the motor 11 is stopped and a robot arm stops by the brake 13. Next, in step S73, the brake control part 25 reads unlocking time data from the brake unlocking time setting part 27, and outputs a signal to the brake driving part 26 so as to unlock the brake 13 for only time according to the unlocking time data. After a lapse of the unlocking time, it proceeds to step S74, and the brake control part 25 reads locking time data from the brake locking time setting part 28, and outputs a signal to the brake driving part 26 so as to lock the brake 13 for only time according to the locking time data. After a lapse of the locking time, it returns to decision on the working state of the unlocking operation switch of step S71. As a result of this, as shown in FIG. 18, while an operator continues to push the unlocking operation switch of the manual operation apparatus 3, unlocking and locking actions of the brake 13 are performed based on the data for the respective time.

Also, when the unlocking operation switch is not pushed (OFF), it proceeds to step S75, and processing for deciding whether or not control of the servo system is being exercised is performed and thereafter, it returns to step S71. As a result of that, during the control of the servo system, an unlocked state of the brake 13 continues always. Also, in the case of a state other than in the servo control action in step S75, processing for locking the brake 13 in step S77 is performed and thereafter, it returns to decision on the working state of the unlocking operation switch of step S71.

As described above, the conventional robot presets brake unlocking time and locking time and repeats a sequence of locking and unlocking of the brake 13 based on this setting time, so that a movement speed of an arm at the time of brake unlocking greatly depends on weight, an attitude and a load of the arm.

For example, when the center of gravity in which the weight or the load, etc. of the arm are combined is located in a substantially horizontal position viewed from the center of rotation of a joint in which a brake attempts to be opened, the moment about the joint becomes maximum and as a result of that, rotational acceleration also becomes maximum and the movement speed of the arm increases suddenly at the time of unlocking the brake.

Also, when the center of gravity is located in a substantially vertical position viewed from the center of rotation of the joint, the moment about the joint becomes close to zero and there may be a state in which the arm does not start to move unless an operator applies force due to the presence of friction of a joint part even at the time of unlocking the brake.

In the conventional robot thus, the arm movement speed in the case of unlocking the brake varies suddenly due to weight, an attitude and a load condition, etc. of the arm, so that it was necessary to adjust time setting of locking and unlocking of the brake while the operator monitors movement of the arm Also, in a state in which the arm does not move in the case of unlocking the brake, an operation in which the operator applies force to the arm by hand, etc. was necessary and further it was necessary to perform an operation of the unlocking operation switch and it was difficult to do work alone.

DISCLOSURE OF THE INVENTION

This invention is implemented to solve the problems described above, and an object of the invention is to obtain a robot capable of suppressing high-speed movement of an arm by controlling a brake so that a movement speed of the arm at the time of brake unlocking or a movement amount of the arm within a control program execution cycle becomes within a constant value even when a shape, an attitude and a load condition of a robot arm vary.

Further, an object of this invention is to obtain a robot capable of suppressing high-speed movement of an arm by controlling a brake so that a movement speed of the arm at the time of brake unlocking or a movement amount of the arm within a control program execution cycle becomes between an upper limit value and a lower limit value even when a shape, an attitude and a load condition of a robot arm vary.

Further, an object of this invention is to obtain a robot capable of moving an arm even in the case that it is lacking in moment about a joint due to an attitude of a robot arm like a multi-joint robot and the arm does not move or the case that a movement shaft of an orthogonal type robot is placed substantially horizontally and an arm does not move due to gravity even when a brake is unlocked, and an object of this invention is to obtain a robot capable of suppressing high-speed movement of an arm by controlling a brake when a movement speed or a movement amount of the arm within a control program execution cycle reaches a constant value even after movement is started by its own weight of the arm and so on.

Further, an object of this invention is to obtain a robot capable of suppressing high-speed movement of an arm by storing brake unlocking time and brake locking time according to an attitude and a load condition of a robot arm and reading the optimum brake unlocking time and brake locking time out of the attitude and the load condition and controlling a brake based on their time.

Also, an object is to obtain a robot capable of controlling a movement speed of a work point of a robot top region or a movement amount of the work point within a control program execution cycle to a predetermined value.

A robot according to this invention is constructed so that in the case of shifting a servo system to a control stop state and unlocking a brake of a robot arm, a position of the robot arm is detected by a position detector and an actual movement speed of the arm is calculated from change amounts of a movement position and elapsed time and this actual movement speed is compared with an allowable movement speed and a locking signal or an unlocking signal of the brake is sent to a driving apparatus and as a result of that, the brake is unlocked or locked and the movement speed of the robot arm is controlled within a predetermined value.

Further, a robot according to this invention is constructed so that an upper limit value and a lower limit value of a movement speed of an arm are set and when an actual movement speed exceeds the upper limit value, a brake is locked and when the actual movement speed falls below the lower limit value, the brake is unlocked and the movement speed of the robot arm is controlled between the upper limit value and the lower limit value.

Also, a robot according to this invention is constructed so that in the case of unlocking a brake, a movement position of a robot arm is detected by a position detector and a movement amount of the arm moving during an execution cycle of a brake unlocking program is obtained and this movement amount is compared with a set movement amount and locking and unlocking of the brake are controlled.

Also, a robot according to this invention is constructed so that a motor driving auxiliary switch is provided and when the switch is "ON", a brake is unlocked and a motor is rotated movement speed of an arm is reached and thereafter a movement speed of a robot arm is controlled within a predetermined value.

This invention is constructed so that brake unlocking time and brake locking time according to a shape, an attitude and a load condition of a robot arm are stored previously and the optimum brake unlocking time and brake locking time are read out of the attitude and the load condition and a brake is controlled based on their time.

Also, it is constructed so that from a distance to a robot region set and an actual movement speed of an arm, a movement speed of the robot region is calculated and by a result of comparing the movement speed with an allowable movement speed, a brake is unlocked or locked and the movement speed of a robot arm is controlled.

A robot according to this invention is constructed as described above, and even when a load condition or an attitude of a robot varies, a movement speed of an arm at the time of brake unlocking can be controlled accurately and a robot with high safety can be obtained. Further, when the arm does not move even in the case of unlocking a brake depending on an attitude, it is constructed so as to move the arm by the running torque of the extent to which the arm moves, so that it has an effect capable of obtaining a robot capable of brake unlocking operation alone.

BRIEF DESCRIPTION OF THE DRAWINGS

FIG. 15 is a table of locking time and unlocking time stored in a storage part 22 of the sixth embodiment.

BEST MODE FOR CARRYING OUT THE INVENTION

First Embodiment

Figure 1:
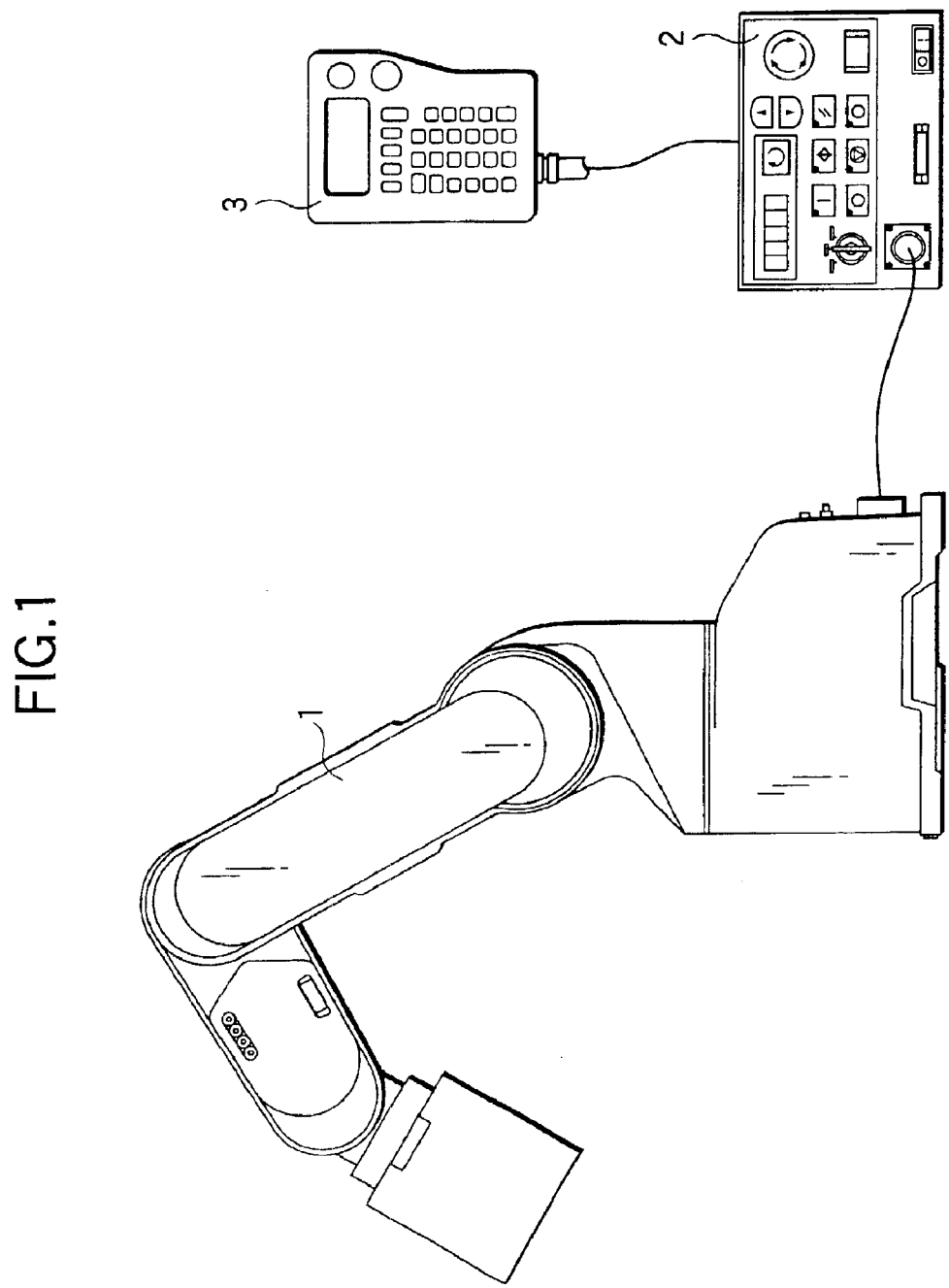
FIG. 1 is an explanatory diagram showing a configuration of a general robot.
Figure 2:
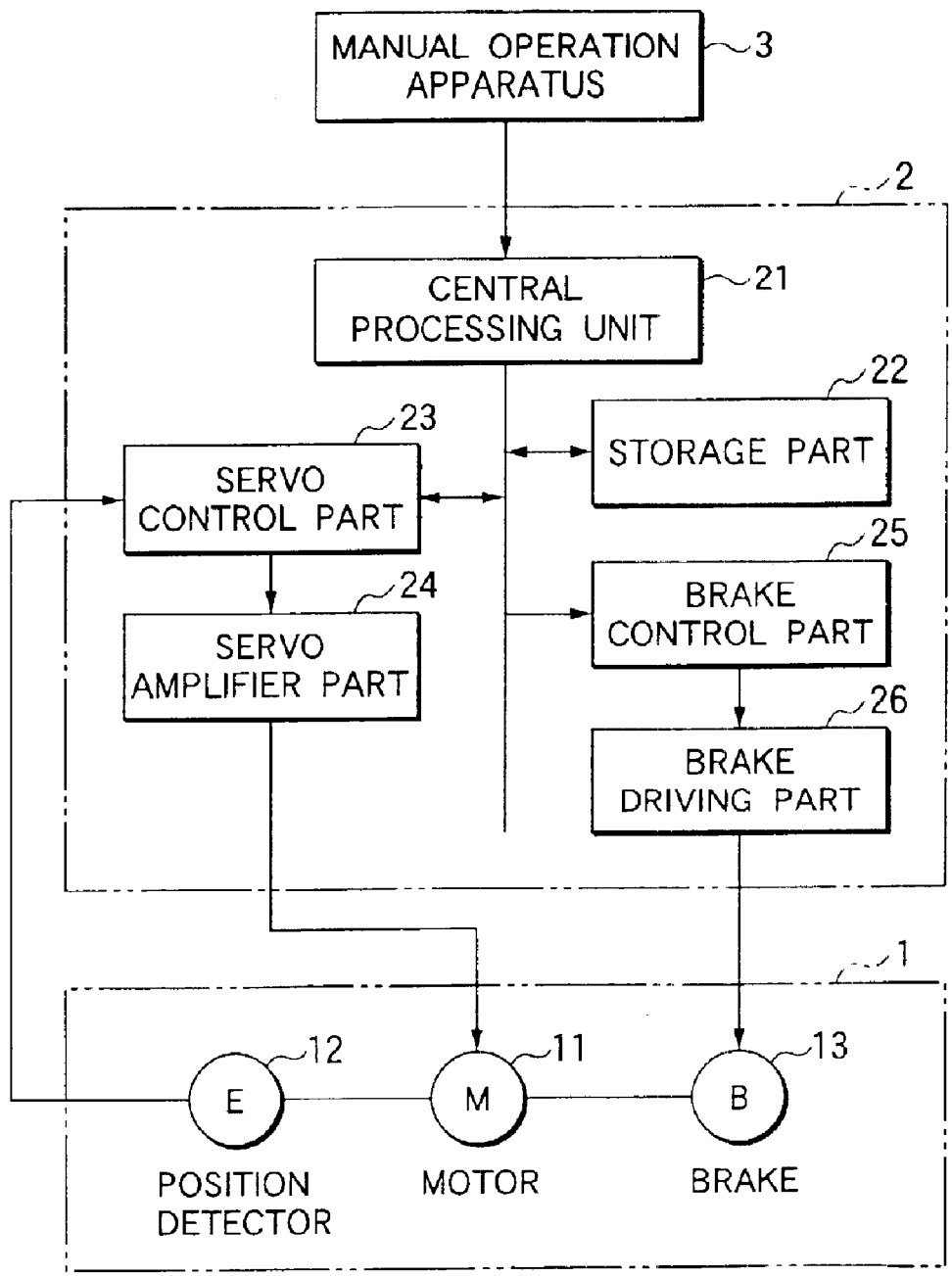
FIG. 2 is a block diagram showing an embodiment of this invention.
Figure 3:
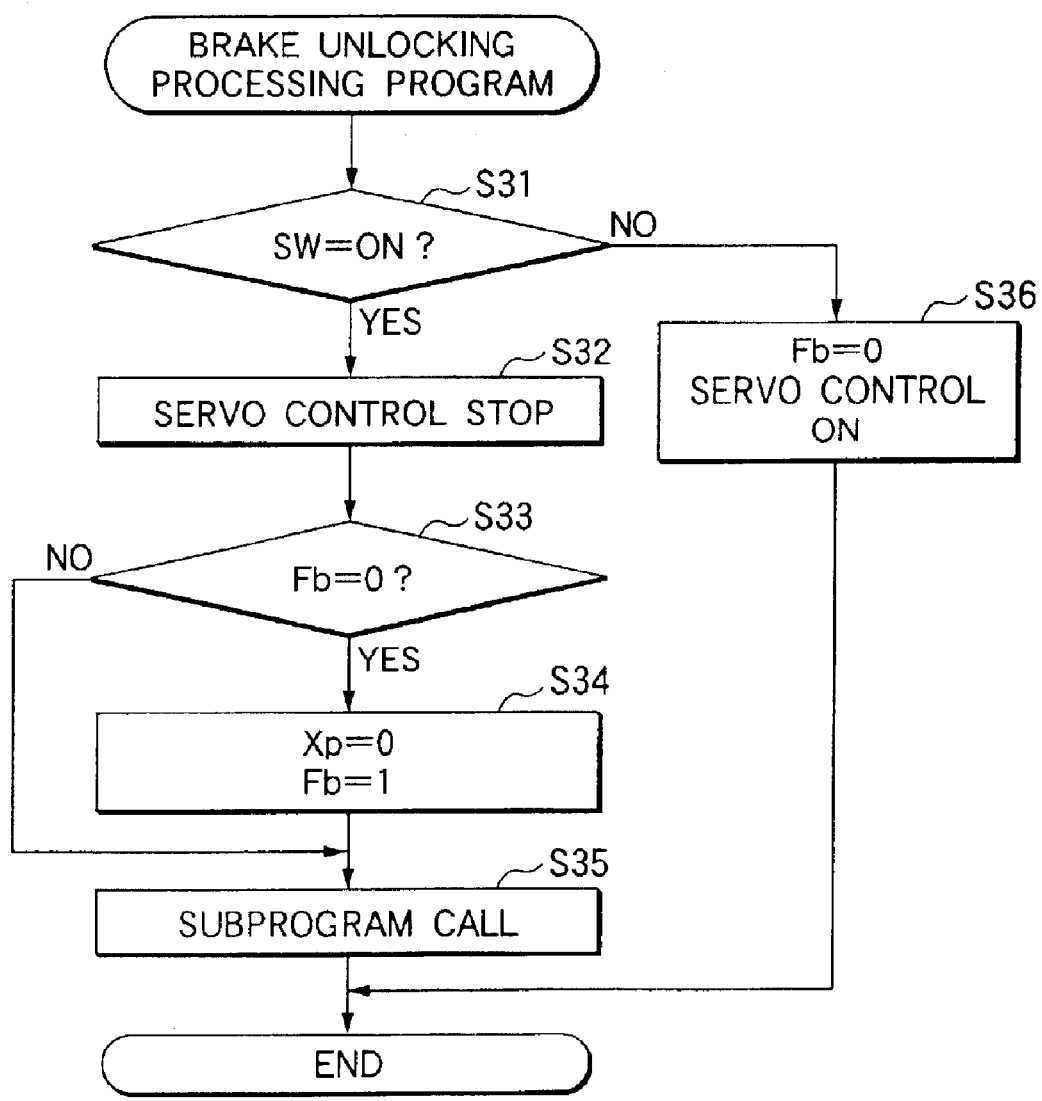
FIG. 3 is a flowchart showing brake unlocking processing in a control program.
Figure 4:
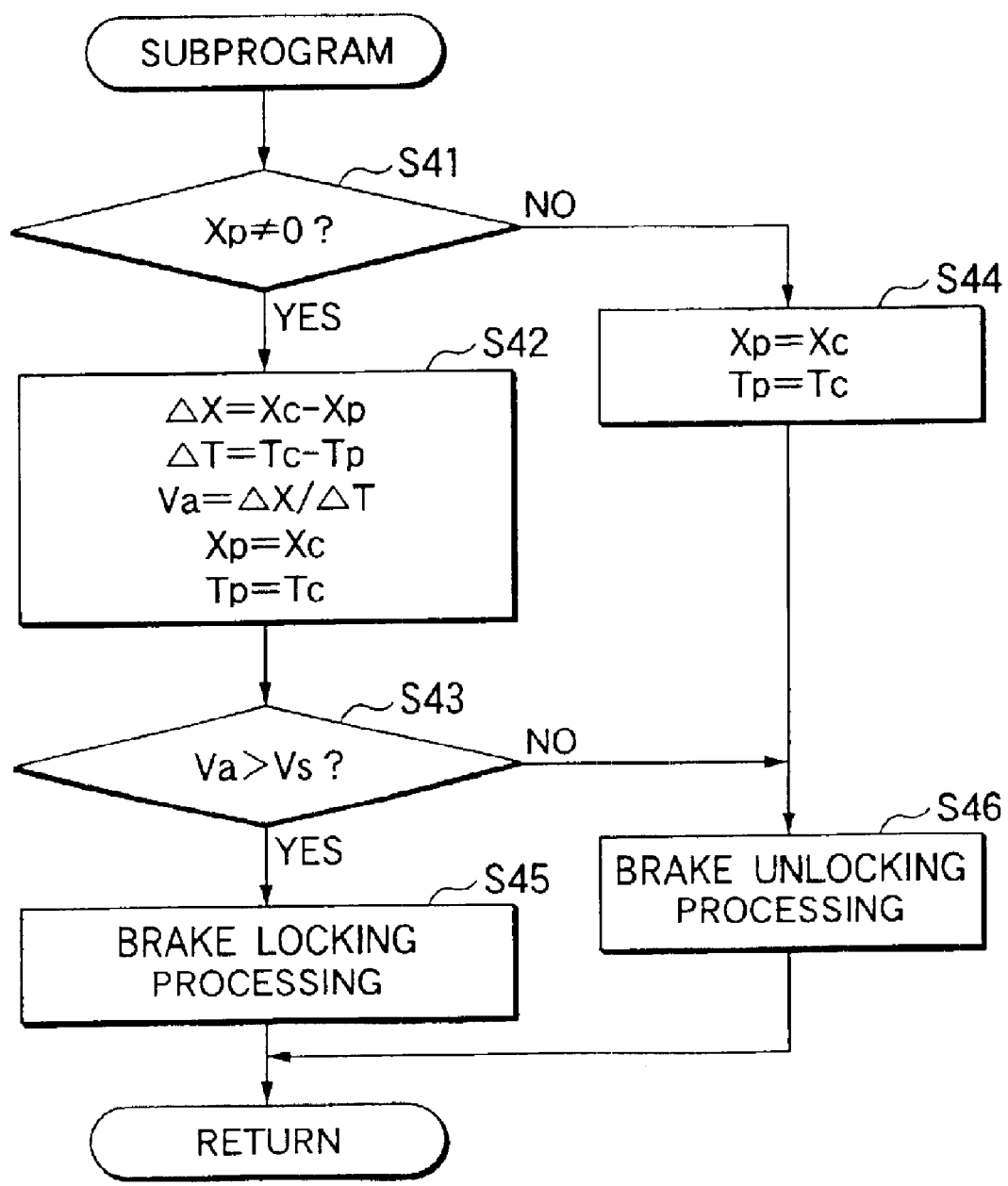
FIG. 4 is a flowchart of a subprogram showing brake unlocking processing of a first embodiment.
Figure 5:
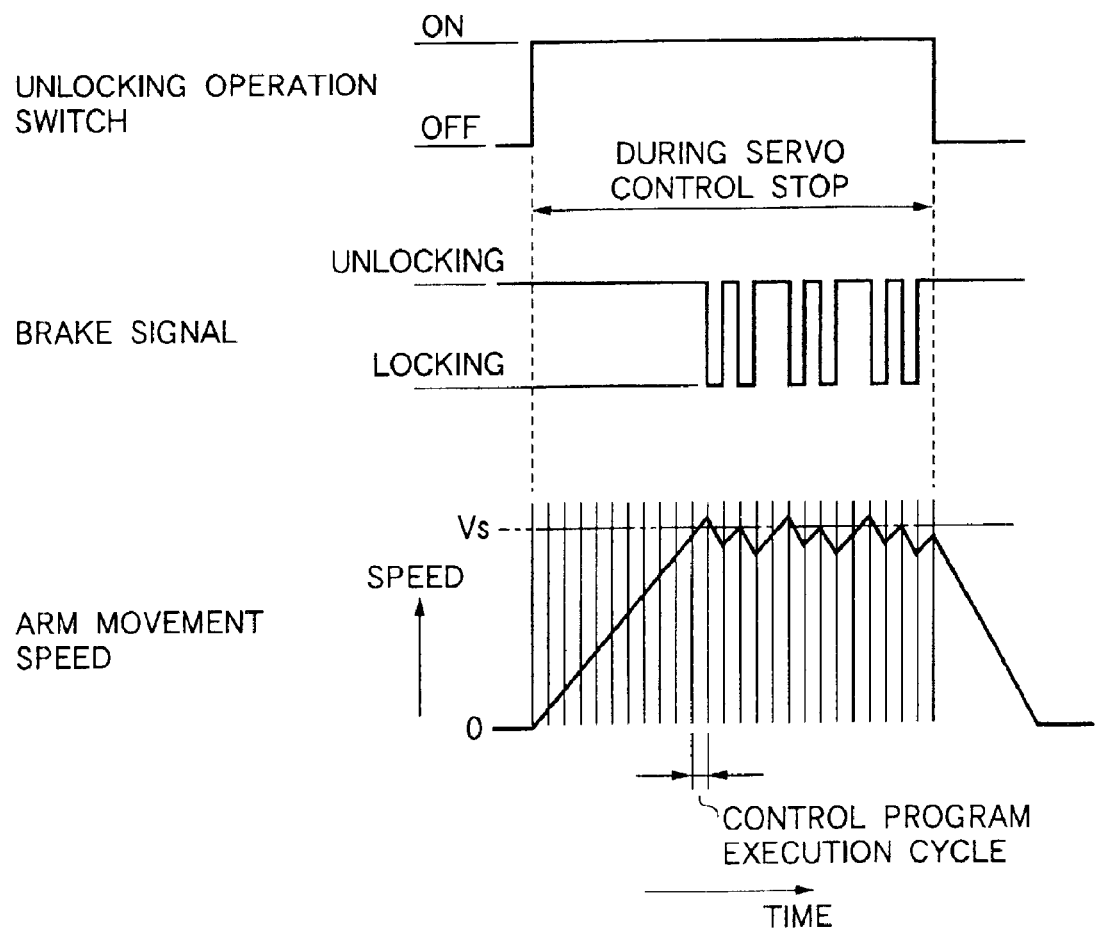
FIG. 5 is an action explanatory diagram of the first embodiment.

FIG. 1 is a diagram showing a configuration of a general robot, and FIG. 2 is a block diagram of a robot which is a first embodiment of this invention. FIG. 3 shows a flowchart showing brake unlocking processing in a control program, and FIG. 4 shows a flowchart of a subprogram for performing brake locking and unlocking processing. FIG. 5 is an action explanatory diagram showing a relation among a state of a brake unlocking switch, a brake signal and an arm movement speed.

Referring first to a configuration, numeral 1 is a robot body, and numeral 2 is a control apparatus for performing various control of a robot, and numeral 3 is a manual operation apparatus for performing an operation of the robot.

Numeral 11 is a motor for driving an arm or a post of the robot, and numeral 12 is a position detector which is provided in a shaft of the motor 11 and detects an attitude position of the arm. Numeral 13 is a brake which is provided in the shaft of the motor 11 and prevents movement by gravity of the arm when a power source of the robot is turned off. The motor 11, the position detector 12 and the brake 13 described above are the same as those of a conventional example.

Numeral 21 is a central processing unit for analyzing and processing an action program of the robot to perform various processing including attitude control of an arm etc. of the robot body 1 or brake unlocking control processing. It is constructed so that the central processing unit 21 repeats a series of position control or input/output processing called a control program on the order of several tens of times per one second, at intervals of several tens of milliseconds in terms of a cycle based on a control program within a storage unit 22. When the central processing unit 21 detects "ON" of an unlocking operation switch for unlocking the brake 13 during execution of the control program, it is constructed so that data of a brake flag Fb within the storage unit 22 is set to "1" and further previous position data Xp is set to "0" and on the other hand, when a brake unlocking command is eliminated, it is constructed so that data of the brake flag Fb is set to "0". Then, when the brake flag Fb is "1", it is constructed so as to start processing of a subprogram of brake unlocking processing shown in FIG. 3.

Numeral 22 is a storage unit which stores action programs, various parameters about control of the robot, control programs for performing processing within the control apparatus 2 and the subprograms, and parameters for performing brake unlocking processing of this invention. As the parameters for performing the brake unlocking processing, present position data Xc and present time data Tc indicating the present position and time of an arm etc., previous position data Xp and previous time. data Tp indicating the position and time in the case of performing the previous processing, and allowable movement speed data Vs and actual movement speed data Va of an arm etc. are allocated.

Numeral 23 is a servo control part for generating a position control signal to the robot by a movement command from the central processing unit 21, and numeral 24 is a servo amplifier part for driving the motor 11 by a control signal from the servo control part 23. Numeral 25 is a brake control part for generating an unlocking control signal of the brake, and numeral 26 is a brake driving part for supplying driving energy to the brake 13 by a control signal from the brake control part 25.

Incidentally, one set of each of the motor 11, the position detector 12, the brake 13, the servo amplifier part 24 and the brake driving part 26 are described for the sake of simplicity of description in FIG. 2, but actually, it goes without saying that plural sets of them according to the number of driving parts held by the robot body 1 can be provided.

Numeral 3 is a manual operation apparatus which is provided with key switches or the like for inputting action programs and various parameters or commanding the brake unlocking processing in this invention and a display unit for performing the present position display and so on. Incidentally, while being not illustrated herein, functions of input or display of the manual operation apparatus 3 may be incorporated into the control apparatus 2 to be provided.

Next, an action will be described using FIGS. 3 to 5.

Before a brake unlocking command, an operator operates the key switches of the manual operation apparatus 3 and is caused to store allowable movement speed data Vs of an arm in the storage unit 22.

First, when the central processing unit 21 detects that an unlocking operation switch is "ON" in step S31 of a control program of FIG. 3, the action proceeds to processing of step S32. In step S32, an output signal from the servo control part 23 to the servo amplifier part 24 is stopped to prohibit an output to the motor 11. However, a position detection action of the position detector 12 is performed and a position of an arm is stored in the storage part 22 as the present position data Xc etc. via the servo control part 23.

Next, it proceeds to step S33, but a brake flag Fb has been set to "0" in step S36 when the unlocking operation switch was in an "OFF" state previously, so that it proceeds to processing of step S34 for only the first time. In step S34, the central processing unit 21 sets data of the brake flag Fb to "1" and sets the previous position data Xp to "0". Then, it proceeds to step S35 and a subprogram for brake unlocking of FIG. 4 is called. Thus, for a period during which the unlocking operation switch is "ON", the subprogram of FIG. 4 is called to perform brake unlocking processing anytime.

Incidentally, when the central processing unit 21 detects that a state of the unlocking operation switch is "OFF" in step S31, it proceeds to step S36, and the brake flag Fb is set to "0" and an output signal from the servo control part 23 to the servo amplifier part 24 is sent and the brake 11 is unlocked and a normal servo system is shifted to a control state and then it exits from the brake unlocking processing program of FIG. 3.

Next, processing at the time when the subprogram of brake unlocking shown in FIG. 4 is called will be described.

In step S41, it is first checked whether or not the previous position data Xp is "0" and when it is "0", in other words, in first processing in which the unlocking operation switch changes from "OFF" to "ON", it proceeds to step S44, and the previous position data Xp is rewritten to the present position data Xc and then the previous time data Tp is rewritten to to the present time data Tc. Then, it proceeds to step S46 and brake unlocking processing is performed. The brake unlocking processing is performed by sending its command from the central processing unit 21 to the brake driving part 26 through the brake control part 25 and finally supplying driving energy for unlocking the brake 13 from the brake driving part 26. When the brake unlocking processing of step S46 is completed, it exits from the subprogram once.

The case that a subprogram of the next brake unlocking processing is processed from among control programs will be described. When "ON" of the unlocking operation switch is continued in step S31, it proceeds to step S32 and control stop processing of a servo system is performed. In the next step S33, the brake flag Fb has been set to "1" in step S34 of the brake unlocking processing of the control program executed previously, so that it proceeds to step S35 subsequent to the second and a subprogram of brake unlocking processing of FIG. 4 is called.

In step S41 of a subprogram call subsequent to the second, the present position data Xc at the time of processing of previous time has been substituted for the previous position data Xp, so that the previous position data Xp is not "0" and it proceeds to step S42 In step S42, the movement amount ΔX and elapsed time ΔT from a point in time of processing of previous time to a point in time of processing of this time and actual movement speed data Va are obtained from the following expressions.

$$\Delta X = Xc - Xp$$

$$\Delta T = Tc - Tp$$

$$Va = \Delta X/\Delta T$$

After the above-mentioned calculation, in order to calculate the movement amount and speed of the case that the next subprogram is called, the following and the present data are substituted.

$$Xp = Xc$$

$$Tp = Tc$$

Next, it proceeds to step S43, and control is performed so that when actual movement speed data Va is larger than allowable movement speed data Vs, it proceeds to step S45 and the brake is locked and on the other hand, when the actual movement speed data Va is smaller than the allowable movement speed data Vs, it proceeds to step S46 and the brake 13 is unlocked.

The processing described above is performed as shown in the action explanatory diagram of FIG. 5. First, when the unlocking operation switch becomes "ON", the brake 13 is unlocked until movement is started by arm's own weight and the allowable movement speed data Vs is reached.

Incidentally, in the drawing, a movement speed of an arm is approximated by a straight line to be shown, but a ratio at which the arm movement speed at the time of unlocking the brake 13 increases changes by an attitude of the arm and also a ratio at which the brake 13 is locked and the movement speed decreases is determined by braking force of the brake 13 and inertia of the arm and so on.

After reaching the allowable movement speed data Vs, locking and unlocking processing of the brake 13 is repeatedly performed in the vicinity of the allowable movement speed data Vs. When the unlocking operation switch becomes "OFF", it returns to a control state of a servo system at once and the brake 11 is unlocked and servo position control is performed so that the arm stops by the present position data Xc.

As described above, in the case of performing the brake unlocking processing, the movement speed of the arm is limited to the allowable movement speed and the arm does not move at high speed, so that a robot with high safety can be obtained.

Second Embodiment

A second embodiment is constructed so that an actual movement speed is compared with an upper limit allowable movement speed and a lower limit allowable movement speed and in the case of exceeding the upper limit value, brake locking processing is performed and in the case of falling below the lower limit value, brake unlocking processing is performed and in the case of the middle of the upper limit value and the lower limit value, the previous processing is continued, and the configuration is identical to that of the first embodiment.

Figure 6:
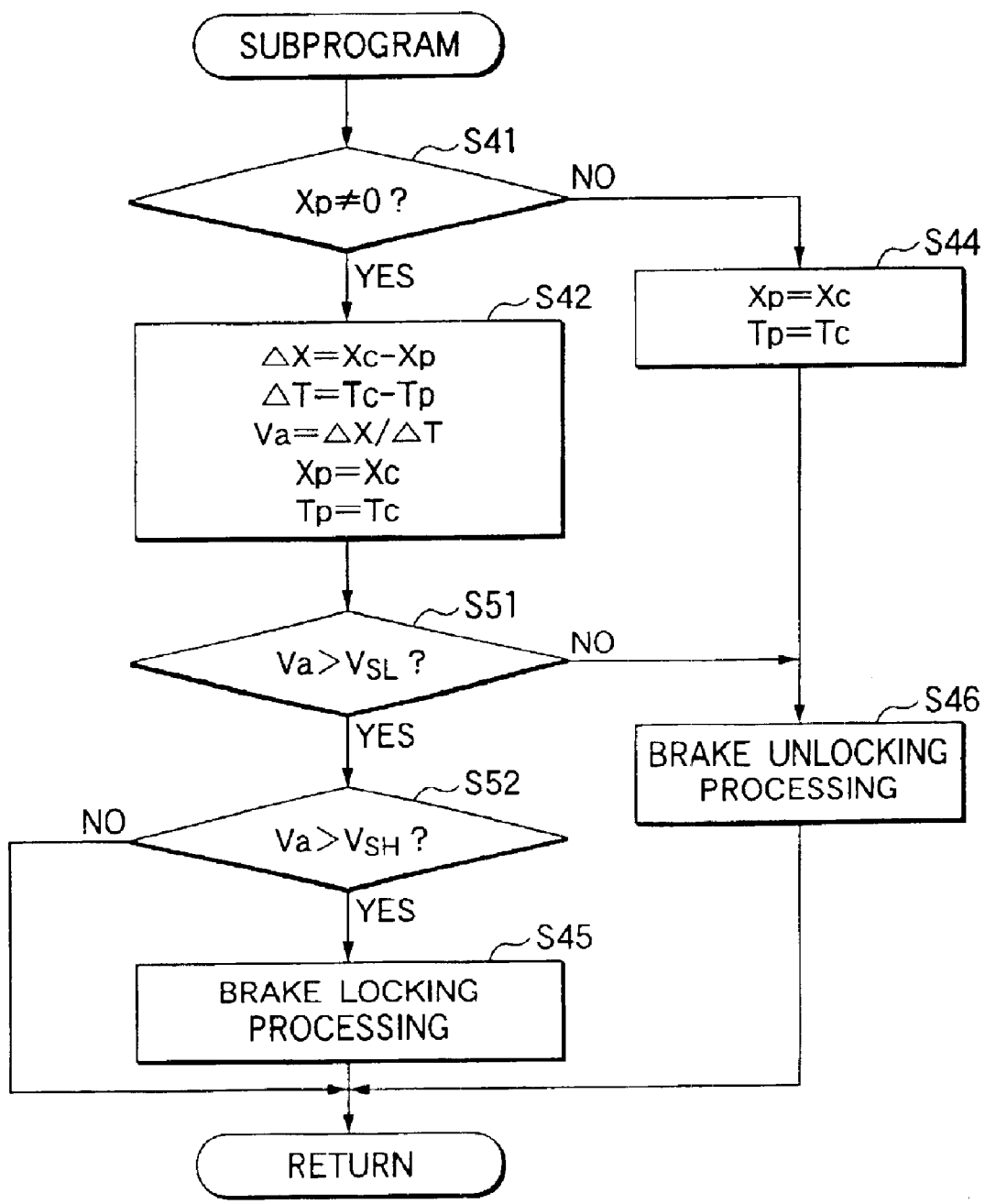
FIG. 6 is a flowchart of a subprogram showing brake unlocking processing of a second embodiment.
Figure 7:
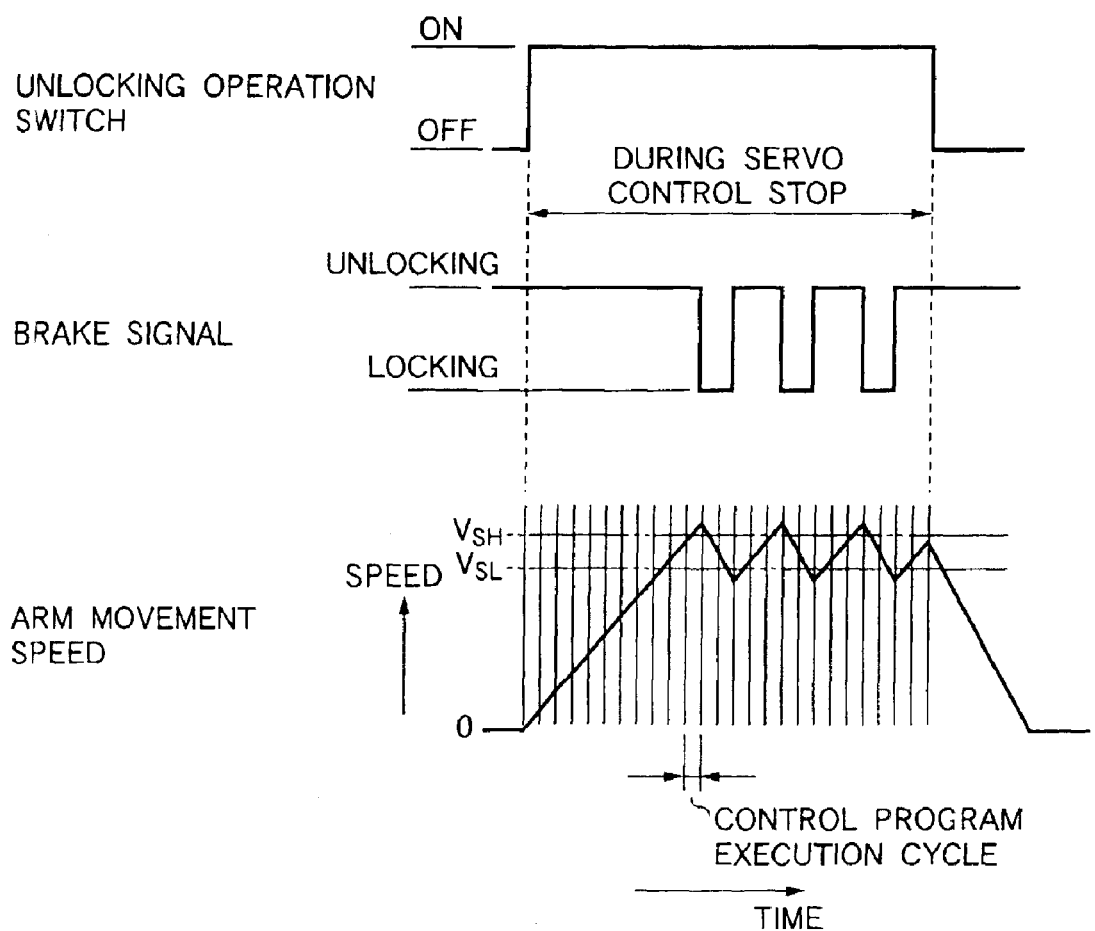
FIG. 7 is an action explanatory diagram of the second embodiment.

A control program in the second embodiment has a flowchart identical to the flowchart of FIG. 3 in the first embodiment, and in a flowchart of a subprogram, as shown in FIG. 6, a portion of processing differs as compared with the first embodiment. Incidentally, the same step numbers are used in steps which are processing identical to that of FIG. 4 of the first embodiment. FIG. 7 is an action explanatory diagram showing a relation among a state of a brake unlocking switch, a brake signal and an arm movement speed in the second embodiment.

A portion different from the first embodiment will be described below using a flowchart. Incidentally, in the case of starting of brake unlocking processing, it is assumed that an operator previously inputs upper limit allowable movement speed data $V_{SH}$ and lower limit allowable movement speed data $V_{SL}$ from a manual operation apparatus 3 to a storage part 22.

After obtaining actual movement speed data Va in step S42, the flowchart proceeds to step S51 and the actual movement speed data Va is compared with the lower limit allowable movement speed data $V_{SL}$ and when the actual movement speed data Va is smaller, it proceeds to step S46 and brake unlocking processing is performed. Also, when the actual movement speed data Va is larger, it proceeds to step S52. In step S52, the actual movement speed data Va is compared with the limit allowable movement speed data $V_{SH}$ and when the actual movement speed data Va is larger, it proceeds to step S45 and brake locking processing is performed. Also, when the actual movement speed data Va is smaller, it exits from this subprogram, so that the brake locking processing of step S45 or the brake unlocking processing of step S46 performed previous time is continued.

In the second embodiment, as compared with the first embodiment, a processing interval between brake locking and brake unlocking increases as shown in FIG. 7 and frequency of chattering of locking and unlocking of the brake 13 can be reduced.

Third Embodiment

A third embodiment is constructed so that in the case of shifting a servo system to a control stop state and unlocking a brake of a robot arm, a movement position of the robot arm is detected by a position detector and an arm movement amount moving during an execution cycle of a brake unlocking program is obtained and this arm movement amount is compared with a set movement amount and locking and unlocking of the brake are controlled, and the configuration is identical to that of the first embodiment.

Figure 8:
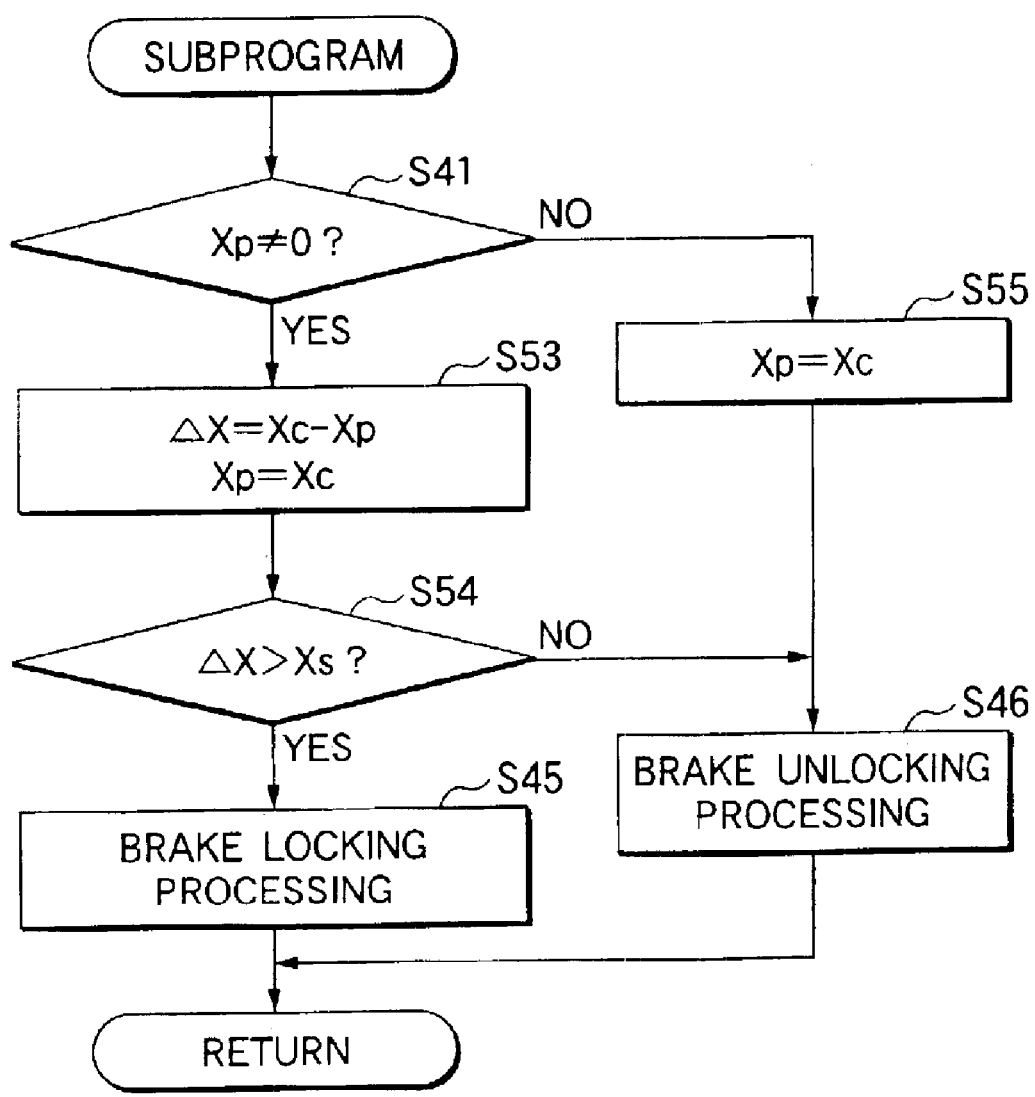
FIG. 8 is a flowchart of a subprogram showing brake unlocking processing of a third embodiment.

A control program in the third embodiment has a flowchart identical to the flowchart of FIG. 3 in the first embodiment, and in a flowchart of a subprogram, as shown in FIG. 8, a portion of processing differs as compared with the first embodiment. Incidentally, the same step numbers are used in steps which are processing identical to that of FIG. 4 of the first embodiment.

A different portion in a subprogram for brake unlocking will be described below.

In a call of the first subprogram in which an unlocking operation switch is switched from "OFF" to "ON", previous position data Xp is set to "0", so that the flowchart proceeds from step S41 to step S55. In step S55, present position data Xc is substituted for the previous position data Xp and it proceeds to step S46 and brake unlocking processing is performed and it exits from the subprogram.

In a call of a subprogram subsequent to the second, the present position data Xc at the time of the previous processing has been substituted as the previous position data Xp in step S55, so that a decision of step S41 proceeds to step S53. In step S53, an actual movement amount ΔX is obtained from a difference between the present position data Xc and the previous position data Xp. Then, in step S54, the actual movement amount ΔX is compared with a set movement amount Xs and when the actual movement amount ΔX is larger, brake locking processing of step S45 is performed and when the actual movement amount ΔX is smaller, brake unlocking processing of step S46 is performed.

As described above, when the unlocking operation switch is "ON", a brake 13 is unlocked until an arm starts movement by its own weight and the actual movement amount ΔX per execution processing of a control program reaches the set movement amount Xs. Thereafter, locking and unlocking processing of the brake 13 is performed based on the set movement amount Xs. When the unlocking operation switch becomes "OFF", it returns to a control state of a servo system at once and the brake 11 is unlocked and servo position control is performed so that the arm stops by the present position data Xc.

In the third embodiment, the fact that a control program is executed on the order of several tens of times per one second, at intervals of several tens of milliseconds in terms of a cycle and elapsed time ΔT becomes a substantially constant time interval is used, so that calculation processing of the elapsed time ΔT by a central processing unit 21 can be eliminated.

Also, as well as setting the set movement amount Xs directly as a parameter, it can also be constructed so that by inputting allowable movement speed data Vs, the set movement amount Xs is obtained by the central processing unit 21 and is stored in a storage part 22. Further, it can also be constructed so that the number of pulses which are a position signal sent from a position detector 12 to a servo control part 23 is used instead of the set movement amount Xs.

Fourth Embodiment

A fourth embodiment is constructed so that in the case that the center of gravity in which an attitude or a load, etc. of an arm of a robot body 1 are combined is located in a substantially vertical position viewed from a joint like a multi-joint robot and moment about the joint is close to zero, or the case that a movement shaft of an orthogonal type robot is placed substantially horizontally and an arm does not move, there is means for avoiding a phenomenon in which the arm does not start to move unless an operator applies force even at the time of unlocking a brake 13 and in the case that a motor auxiliary rotary switch is "ON", rotational movement of a motor 11 is performed until actual movement speed data Va of the arm reaches allowable movement speed data Vs.

Figure 9:
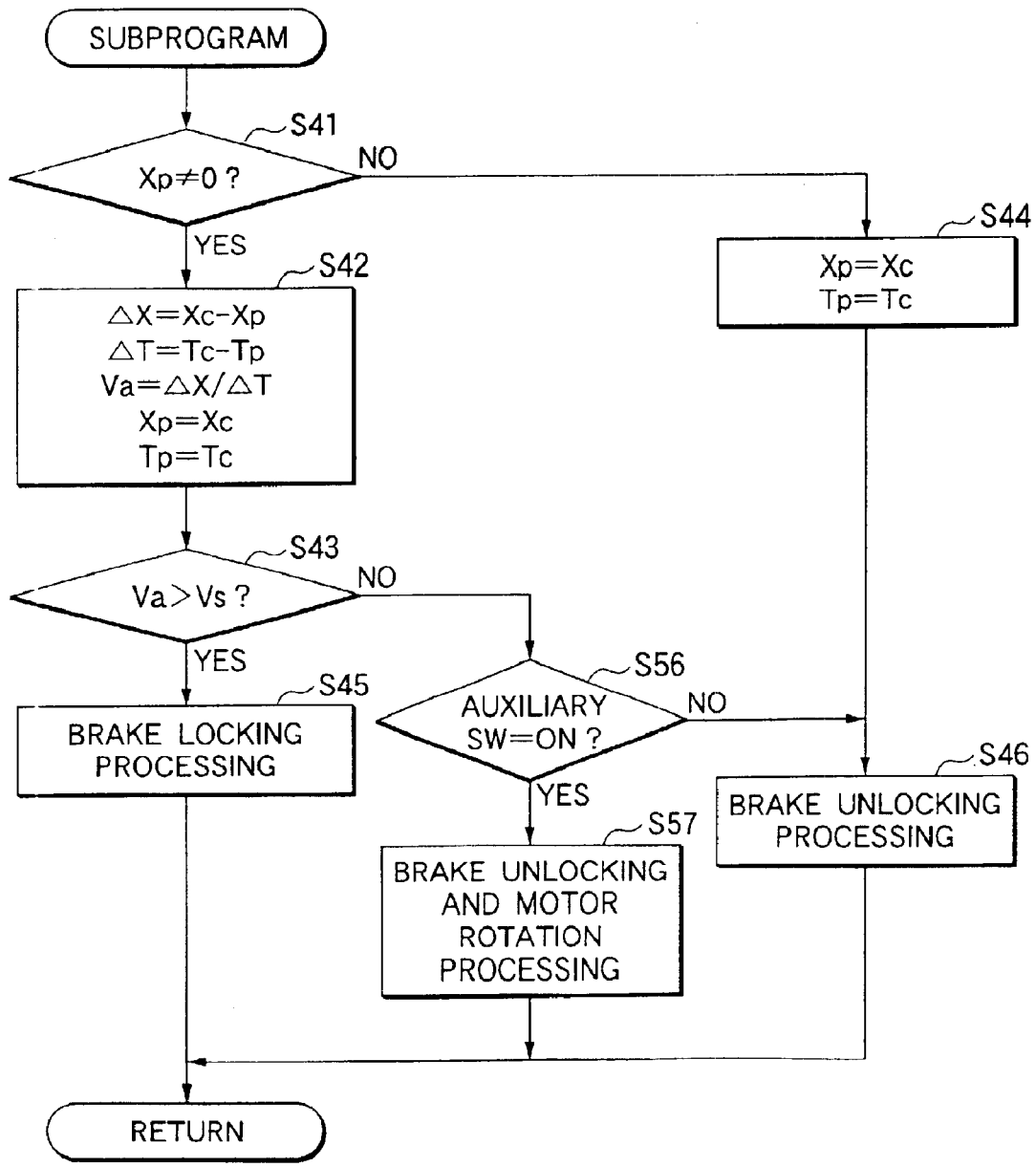
FIG. 9 is a flowchart of a subprogram showing brake unlocking processing of a fourth embodiment.

A control program in the fourth embodiment has a flowchart identical to the flowchart of FIG. 3 in the first embodiment, and in a flowchart of a subprogram, as shown in FIG. 9, a portion of processing differs as compared with the first embodiment. Incidentally, the same step numbers are used in steps which are processing identical to that of the first embodiment.

A different portion in a subprogram for brake unlocking will be described below.

In a call of a subprogram subsequent to the second, a value other than "0" has been substituted for previous position data Xp, so that a decision of step 41 proceeds to step S42. In step S42, the movement amount ΔX and elapsed time ΔT from a point in time of processing of previous time to a point in time of processing of this time and actual movement speed data Va are obtained from the following expressions.

$$\Delta X = Xc - Xp$$

$$\Delta T = Tc - Tp$$

$$Va = \Delta X / \Delta T$$

After the above-mentioned calculation, in order to calculate the movement amount and speed of the case that the next subprogram is called, the following and the present data are substituted.

$$Xp = Xc$$

$$Tp = Tc$$

Next, it proceeds to step S43 and when the actual movement speed data Va is larger than the allowable movement speed data Vs, it proceeds to step S45 and brake locking processing is performed and thereafter, it exits from the subprogram. When the actual movement speed data Va is smaller than the allowable movement speed data Vs, it proceeds to step S56. When the motor auxiliary rotary switch is "ON", it proceeds to step S57 and after brake unlocking processing, constant torque of the extent to which an arm moves is applied to the motor 11 and thereafter, it exits from the subprogram. Also, when the motor auxiliary rotary switch is "OFF" in step S56, it proceeds to step S46 and brake unlocking processing is performed and it exits from the subprogram.

As described above, when the motor auxiliary rotary switch is "ON", an auxiliary movement action of the arm by the motor 11 is performed until the arm starts self-propelling by its own weight and reaches the allowable movement speed data Vs. Also, even when the motor auxiliary rotary switch is "OFF" and a state in which the arm has stopped continues, an operator can also apply force to move the arm freely.

Incidentally, when torque for auxiliary movement applied to the motor 11 is constructed so as to be controlled by constant torque of the extent to which the arm starts movement, the robot body 1 is not damaged mechanically even in case that an operator rotates the motor 11 to the stroke end due to wrong operation.

Fifth Embodiment

A fifth embodiment detects a movement position of a robot arm by a position detector and calculates an actual movement speed of the arm from change amounts of the movement position and elapsed time in a manner similar to the first embodiment. However, the fifth embodiment differs in that a movement speed of a work point of the arm top is obtained from the actual movement speed and a distance to the work point of the arm top and is compared with an allowable movement speed and when the movement speed of the work point of the arm top is larger, brake locking processing is performed and when the movement speed is smaller, brake unlocking processing is performed.

Figure 10:
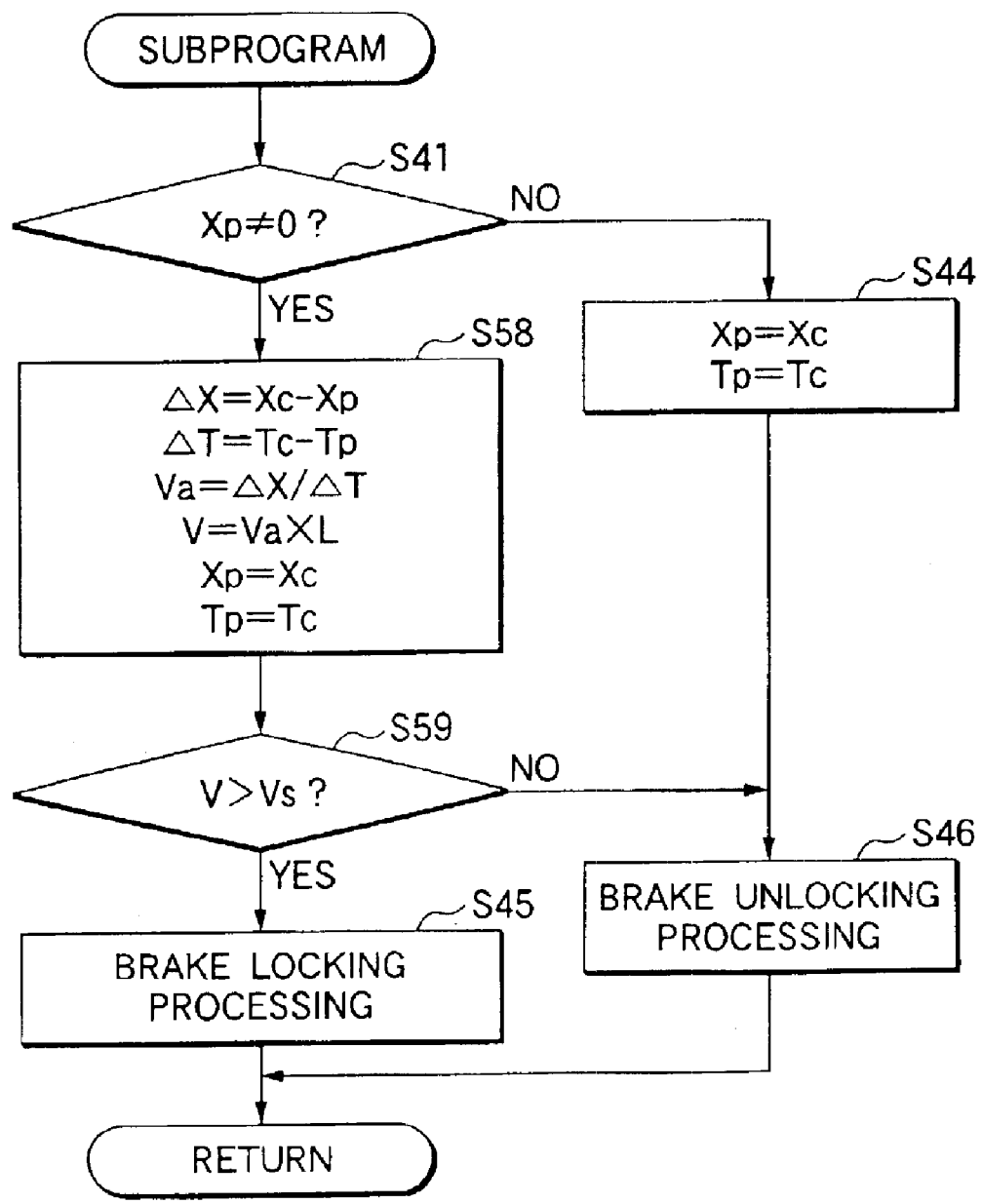
FIG. 10 is a flowchart of a subprogram showing brake unlocking processing of a fifth embodiment.

Therefore, a control program in the fifth embodiment has a flowchart identical to the flowchart of FIG. 3 in the first embodiment, and in a flowchart of a subprogram, as shown in FIG. 10, a portion of processing differs as compared with the first embodiment.

Figure 11:
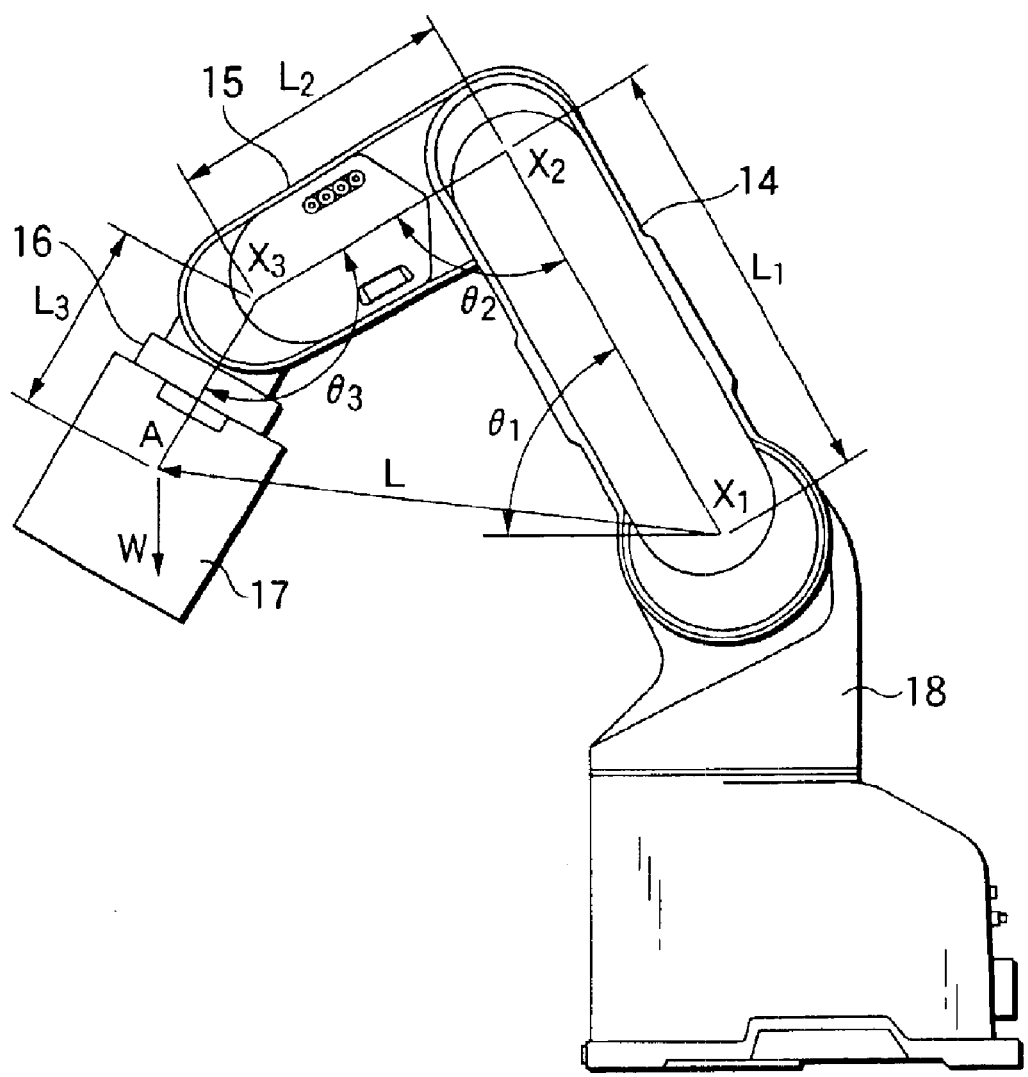
FIG. 11 is an explanatory diagram explaining a distance L to the arm top or a load in a robot of the fifth embodiment.
Figure 12:
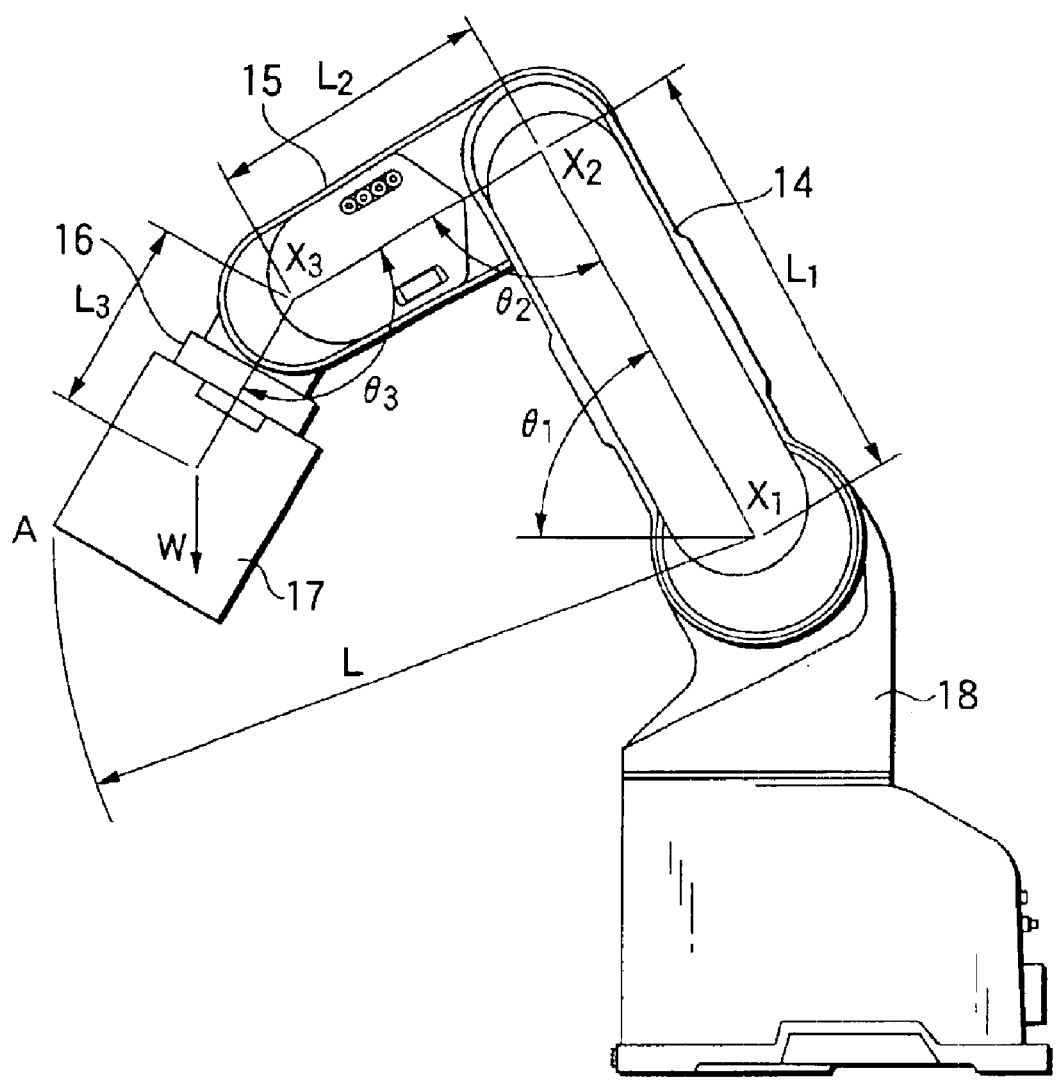
FIG. 12 is an explanatory diagram explaining the distance L to the arm top or the load in the robot of the fifth embodiment.

FIGS. 11 and 12 are explanatory diagrams explaining a distance L from a joint part $X_1$ performing brake unlocking to a work point (shown by point A) of the arm top in a robot body 1. $X_1$, $X_2$, $X_3$ show respective joint part coordinate data, and $L_1$, $L_2$, $L_3$ show distances between joints of a first arm 14, a second arm 15, a wrist shaft 16 or distances between a joint and a work point. $\theta_1$ represents an angle formed by the first arm 14 and a horizontal plane, and $\theta_2$, $\theta_3$ represent angles formed between the arms of each the joint part. Numeral 17 is a load, and numeral 18 is a robot post, and W is weight of the load.

Processing different from the first embodiment will be described below using a flowchart. Incidentally, in the case of starting of brake unlocking processing, it is assumed that an operator previously inputs allowable movement speed data $V_S$ and a distance L to the top or the center of a load from a manual operation apparatus 3 to a storage part 22.

First, in step S41 of a subprogram call of the second of the flowchart shown in FIG. 10, in a manner similar to the first embodiment, the present position data Xc at the time of processing of previous time has been substituted for the previous position data Xp, so that the previous position data Xp is not "0" and it proceeds to step S58. In step S58, the movement amount ΔX and elapsed time ΔT from a point in time of processing of previous time to a point in time of processing of this time, actual movement speed data Va and movement speed data V are obtained from the following expressions.

$$\Delta X = Xc - Xp$$

$$\Delta T = Tc - Tp$$

$$Va = \Delta X / \Delta T$$

$$V = Va \times L$$

After the above-mentioned calculation, in order to calculate the movement amount and speed of the case that the next subprogram is called, the following and the present data are substituted.

$$Xp = Xc$$

$$Tp = Tc$$

Next, it proceeds to step S59, and control is performed so that when movement speed data V is larger than allowable movement speed data Vs, it proceeds to step S45 and a brake is locked and on the other hand, when the movement speed data V is smaller than the allowable movement speed data Vs, it proceeds to step S46 and the brake 13 is unlocked.

In the above description, the case that the operator inputs the distance L has been explained, but when it is constructed so that the distance L is obtained by calculation from the distances $L_1$, $L_2$, $L_3$ between the joints and the angles $\theta_1$, $\theta_2$, $\theta_3$ formed between each of the joints, an input operation of the distance L by the operator can be eliminated.

Sixth Embodiment

A sixth embodiment is constructed so that an arm attitude and a load condition of a robot body 1 are associated with locking time and unlocking time of brake unlocking processing and are stored in a storage part 22 and a brake 13 is controlled according to the stored locking time and unlocking time.

Figure 13:
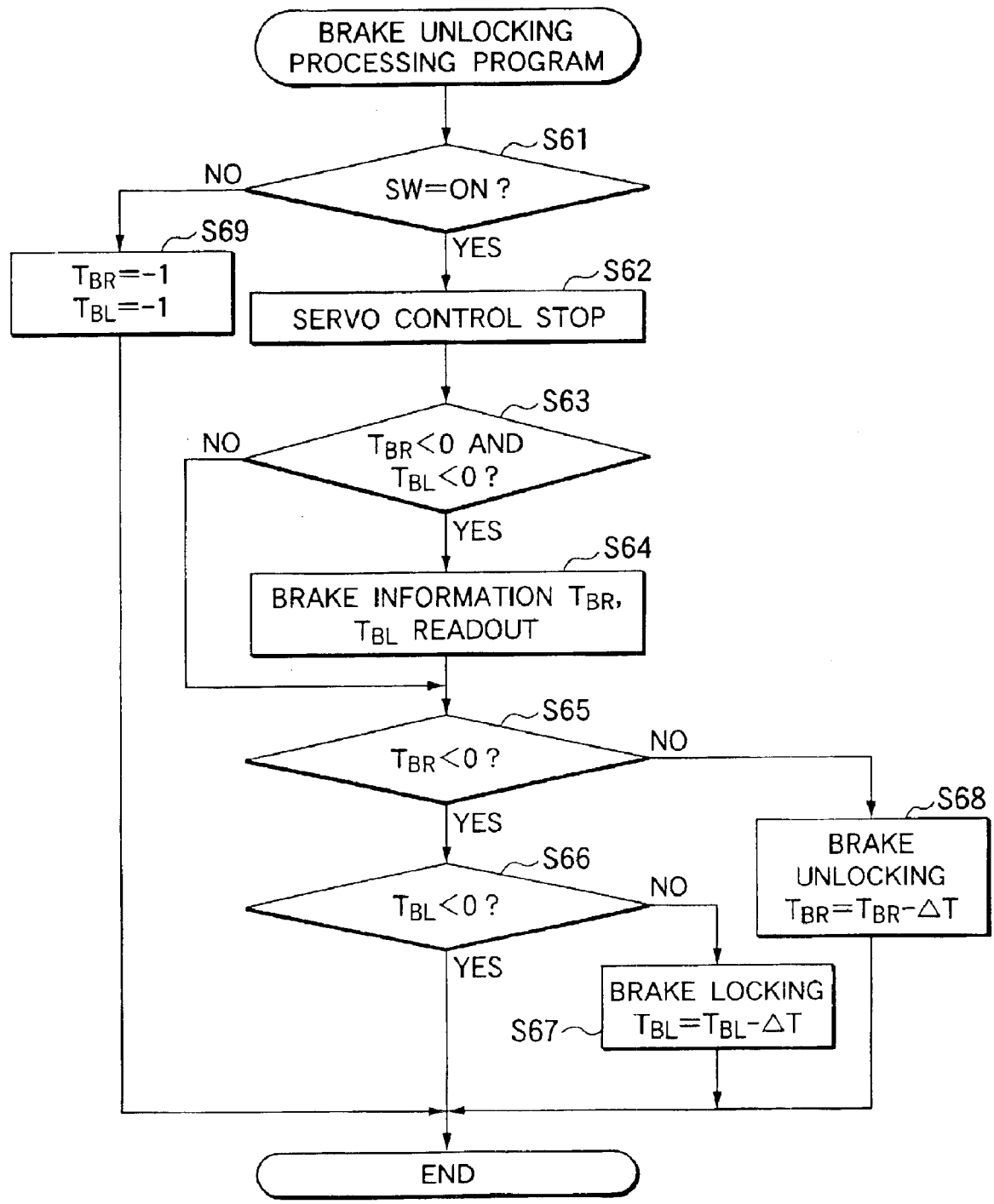
FIG. 13 is a flowchart of a control program for brake unlocking about a sixth embodiment.
Figure 14:
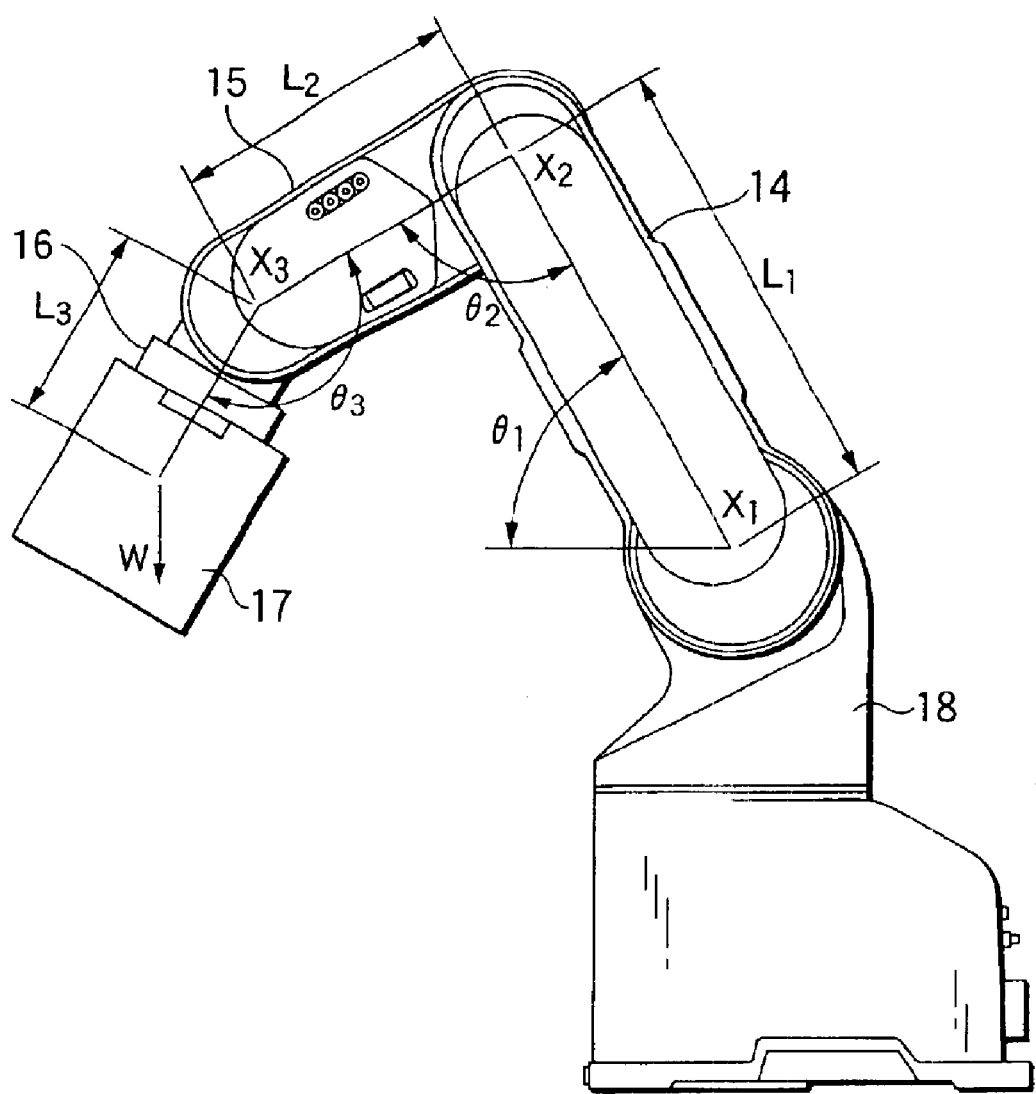
FIG. 14 is an outline diagram explaining a state of a joint part of a multi-joint robot.
Figure 16:
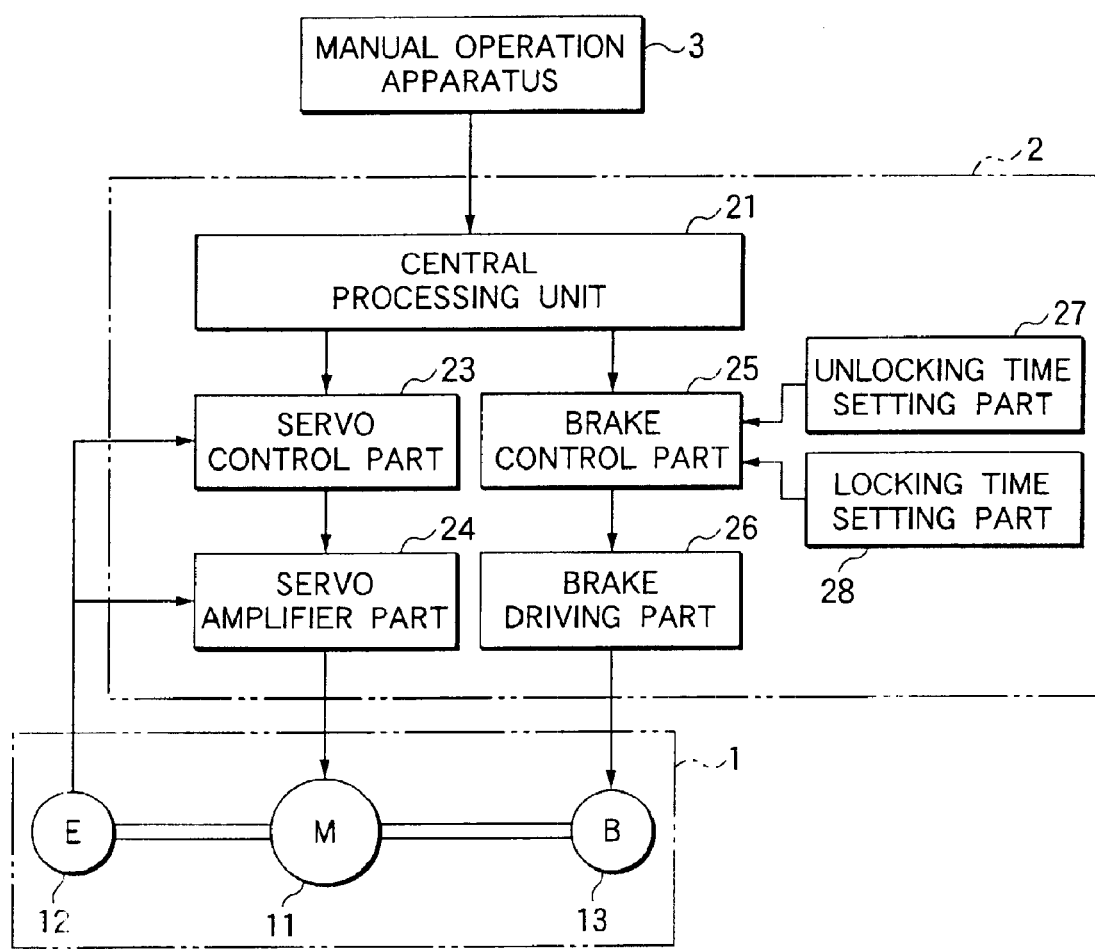
FIG. 16 is a block diagram of a conventional industrial robot control apparatus for unlocking a brake.
Figure 17:
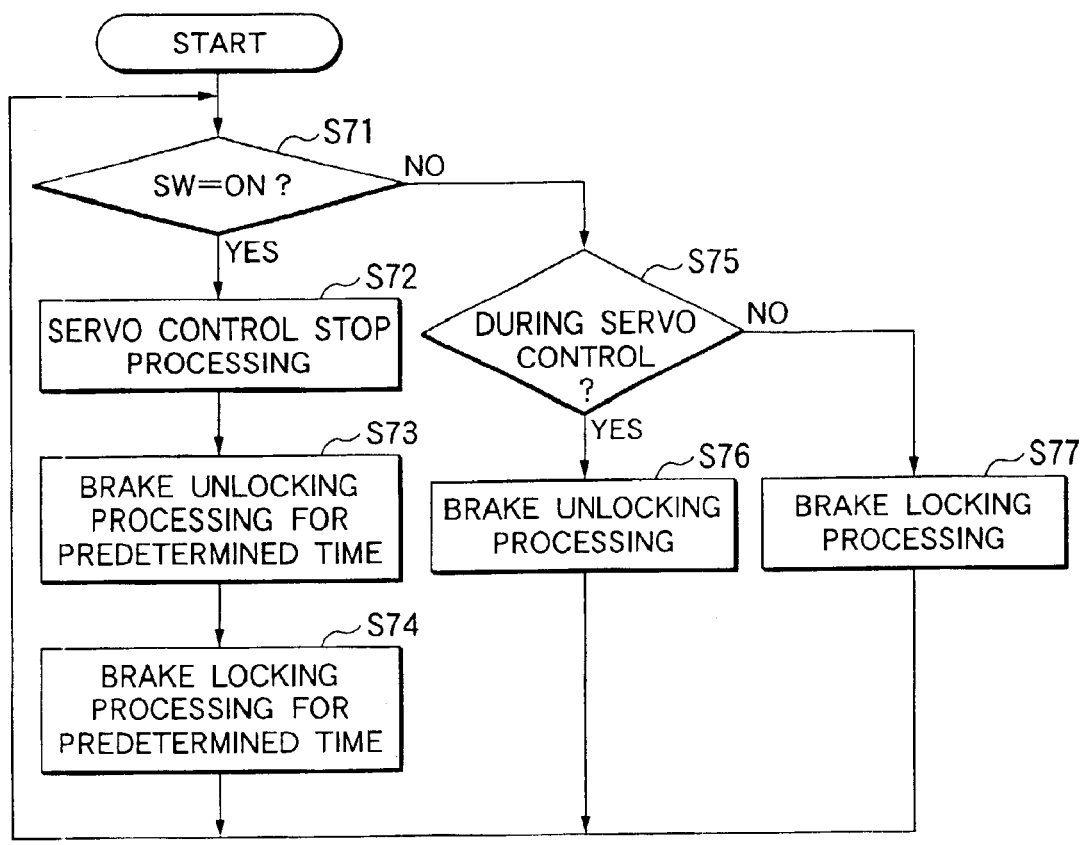
FIG. 17 is a flowchart of a program showing conventional brake unlocking processing.
Figure 18:
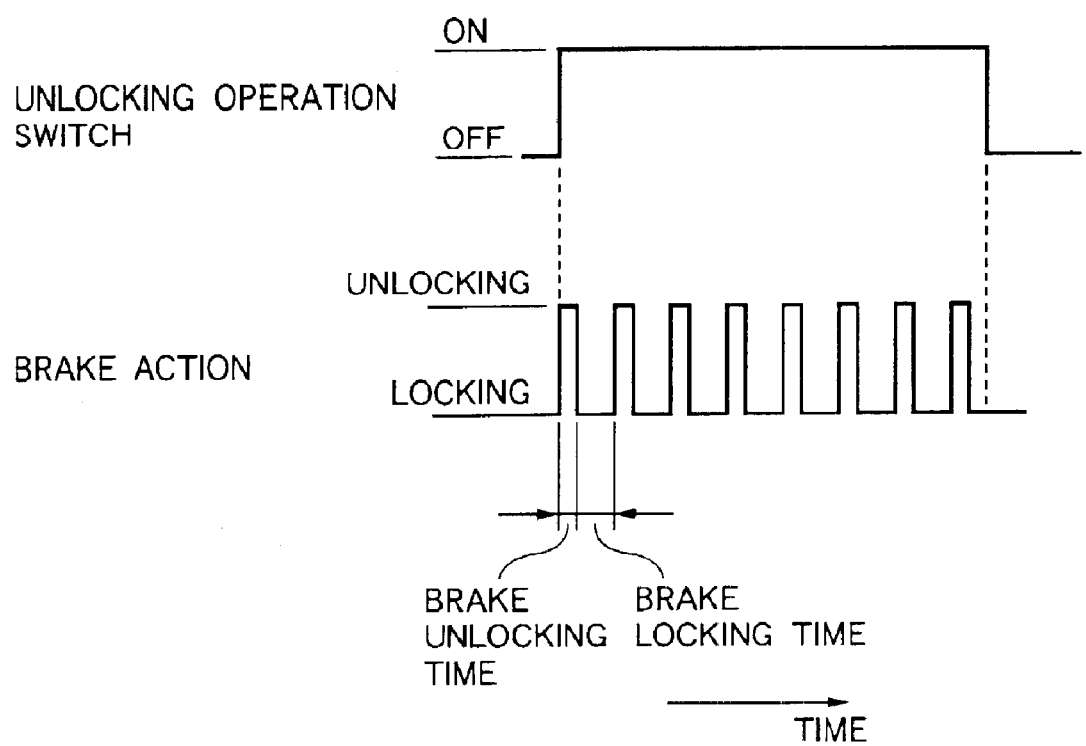
FIG. 18 is a state diagram showing a conventional brake action.

FIG. 13 shows a flowchart of a control program for brake unlocking which is the sixth embodiment, and FIG. 14 shows an outline diagram explaining a state of a joint part of a multi-joint robot, and FIG. 15 shows a table of locking time and unlocking time stored in the storage part 22.

FIG. 14 shows an outline diagram of the robot body 1 explaining various parameters of the sixth embodiment, and numeral 14 is a first arm, and numeral 15 is a second arm, and numeral 16 is a wrist shaft. Numeral 17 is a load and corresponds to a conveyance product in a robot. Numeral 18 is a post which rotatably supports the first arm 14.

$X_1$ represents joint coordinate data controlled by a control apparatus 2 in the case of a state in which a joint part between the post 18 and the first arm is shown by an angle $\theta_1$. As a specific coordinate setting, it may be $\theta_1 = X_1$, but it is represented by a relation expression of $\theta_1 = X_1 + \alpha$. Incidentally, in α, the stroke end may often be defined as "0" generally. Similarly, $X_2$ represents coordinate data in the case of a state in which a joint part between the first arm 14 and the second arm 15 is shown by an angle $\theta_2$, and $X_3$ represents coordinate data in the case of a state in which a joint part between the second arm 15 and the wrist shaft 16 is shown by an angle $\theta_3$.

In a table of FIG. 15, the coordinate data $X_1$ of a first joint indicating an attitude of an arm is divided into five segments of $A_1$ to $F_1$ and also a rotational position $X_2$ of a second joint is divided into four segments of $A_2$ to $E_2$ and a rotational position $X_3$ of a third joint is divided into two segments of $A_3$ to $C_3$ and further a load W of the load 17 is divided into three segments of 0, 2, 4 kg, and data of the optimum unlocking time $T_{BRn}$ and locking time $T_{BLn}$ of a brake is associated with each the segment. It is constructed so that these data of the table are associated and stored in the storage part 22 and the unlocking time $T_{BRn}$ and the locking time $T_{BLn}$ of the brake can be retrieved and read out easily by a central processing unit 21 from the position data $X_1$, $X_2$, $X_3$ of the first joint to the third joint and input data of the load W.

Next, an action will be described using a flowchart of FIG. 13.

When a brake unlocking program in a control program is called, a state of an unlocking operation switch is decided in step S61 and when the state is "OFF", the action proceeds to step S69, and "−1" is set to set brake locking time $T_{BL}$ and set brake unlocking time $T_{BR}$, and it exits from brake unlocking processing. When the unlocking operation switch is "ON" in step S61, it proceeds to step S62, and servo output stop processing for stopping an output from a servo amplifier part 24 to a motor 11 is performed. Next, it proceeds to step S63, and it is decided whether or not both values of the set brake locking time $T_{BL}$ and the set brake unlocking time $T_{BR}$ are minus. Immediately after the unlocking operation switch is switched from "OFF" to "ON", both the values are minus, so that it proceeds to step S64 and based on the present positions $X_1$, $X_2$, $X_3$ of each the joint and the load information W inputted, set brake locking time $T_{BLn}$ and set brake unlocking time $T_{BRn}$ of the closest condition are read out and setting is made as follows.

$$T_{BL} = T_{BLn}$$

$$T_{BR} = T_{BRn}$$

Next, it proceeds to step S68 and brake unlocking processing is performed, and time ΔT taken from the set brake unlocking time $T_{BR}$ to the next processing is subtracted and it exits from a brake unlocking processing program. The brake unlocking processing of step S68 is repeated until the set brake unlocking time $T_{BR}$ has elapsed. After the set brake unlocking time $T_{BR}$ is minus, namely the brake unlocking processing is completed in step S65, it proceeds to step S66 and brake locking processing of step S67 is repeated until the brake locking time $T_{BL}$ has elapsed.

When one cycle of the brake unlocking processing of step S68 and the brake locking processing of step S67 is completed, it proceeds to step S64 again and based on the present positions of each the joint and the load information inputted, new set brake locking time $T_{BL}$ and set brake unlocking time $T_{BR}$ are read out and the brake unlocking processing is repeatedly performed.

As described above, from the coordinate values of the present positions of each the joint of the robot body 1 and the inputted load, the optimum set brake locking time $T_{BLn}$ and set brake unlocking time $T_{BRn}$ stored in the storage part 22 are called and the brake unlocking processing is performed, so that it is unnecessary to do calculation etc. for obtaining the actual rotational speed data Va from the present position data Xc, the previous position data Xp, the present time data Tc, the previous time data Tp, etc. as shown in the first embodiment or the third embodiment, and processing can be simplified.

Incidentally, in the case of performing unlocking and locking control of a brake, in each the embodiment described above, techniques in which a movement speed is compared with an allowable movement speed or a movement amount within a control program execution cycle is compared with an allowable movement amount and also an upper limit value and a lower limit value are provided in the allowable movement speed or the allowable movement amount to make a comparison can also be replaced properly, or two or more can also be used in combination.

Industrial Applicability

As described above, a robot according to this invention is suitable to perform brake unlocking and move an arm to the outside of a stroke range or move the arm from the outside to the inside of the stroke range.

What is claimed is:

1. A robot comprising:
a driving apparatus for moving and driving a robot arm,
a position detector for detecting a position of the robot arm,
a brake apparatus for maintaining a stationary attitude of the robot arm, and
an unlocking switch for stopping servo control and unlocking the brake apparatus, characterized in that it is constructed so that when a command from the unlocking switch is given, a movement speed is calculated based on a position change amount and elapsed time from the position detector and also is compared with an allowable movement speed specified previously and when the movement speed is larger, a brake is locked and when the movement speed is smaller, the brake is unlocked.

2. A robot comprising:
a driving apparatus for moving and driving a robot arm,
a position detector for detecting a position of the robot arm,
a brake apparatus for maintaining a stationary attitude of the robot arm, and
an unlocking switch for stopping servo control and unlocking the brake apparatus, characterized in that it is constructed so that when a command from the unlocking switch is given, a movement amount within a control program execution cycle is obtained from a change amount of the position detector and is compared with an allowable movement amount specified previously and when the movement amount is larger, a brake is locked and when the movement amount is smaller, the brake is unlocked.

3. A robot comprising:
a driving apparatus for moving and driving a robot arm,
a position detector for detecting a position of the robot arm,
a brake apparatus for maintaining a stationary attitude of the robot arm,
an unlocking switch for stopping servo control and unlocking the brake apparatus, and
an auxiliary rotary switch for switching whether or not the driving apparatus is rotated to move the robot arm at the time of a servo control stop by the unlocking switch, characterized in that it is constructed so that when a command from the unlocking switch is given and the auxiliary rotary switch is switched so as to move the robot arm, a movement speed is calculated based on a position change amount and elapsed time from the position detector and is compared with an allowable movement speed specified previously and when the movement speed is larger, a brake is locked and when the movement speed is smaller, the brake is unlocked and also the driving apparatus is moved by predetermined torque.

4. A robot comprising:
a driving apparatus for moving and driving a robot arm,
a position detector for detecting a position of the robot arm,
a brake apparatus for maintaining a stationary attitude of the robot arm, and
an unlocking switch for stopping servo control and unlocking the brake apparatus, and
an auxiliary rotary switch for switching whether or not the driving apparatus is rotated to move the robot arm at the time of a servo control stop by the unlocking switch, characterized in that it is constructed so that when a command from the unlocking switch is given and the auxiliary rotary switch is switched so as to move the robot arm, a movement amount within a control program execution cycle is obtained from a change amount of the position detector and is compared with an allowable movement amount specified previously and when the movement amount is larger, a brake is locked and when the movement amount is smaller, the brake is unlocked.

5. A robot comprising:
a driving apparatus for moving and driving a robot arm,
a position detector for detecting a position of the robot arm,
a brake apparatus for maintaining a stationary attitude of the robot arm, and
an unlocking switch for stopping servo control and unlocking the brake apparatus, characterized in that it is constructed so that when a command from the unlocking switch is given, from a distance to a robot region preset and a movement speed obtained by a position change amount and elapsed time from the position detector, a movement speed in the robot region is calculated and is compared with an allowable movement speed preset and when the movement speed is larger, a brake is locked and when the movement speed is smaller, the brake is unlocked.

6. A robot comprising:

a driving apparatus for moving and driving a robot arm, a position detector for detecting a position of the robot arm, a brake apparatus for maintaining a stationary attitude of the robot arm, and an unlocking switch for stopping servo control and unlocking the brake apparatus, characterized in that it is constructed so that when a command from the unlocking switch is given, from a distance to a robot region preset and a position change amount from the position detector within a control program execution cycle, a movement amount in the robot region is calculated and is compared with an allowable movement amount preset and when the movement amount is larger, a brake is locked and when the movement amount is smaller, the brake is unlocked.

7. A robot comprising:

a driving apparatus for moving and driving a robot arm, a position detector for detecting a position of the robot arm, a brake apparatus for maintaining a stationary attitude of the robot arm, and an unlocking switch for stopping servo control and unlocking the brake apparatus, characterized in that it is constructed so that when a command from the unlocking switch is given, a movement speed of a work point of the arm top obtained by a present position, a position change amount and elapsed time from the position detector indicating a length of the arm and its attitude is compared with an allowable movement speed preset and when the movement speed is larger than the allowable movement speed, a brake is locked and when the movement speed is smaller than the allowable movement speed, the brake is unlocked.

8. A robot as defined in any of claims 1, 3, 5 and 7, characterized in that it is constructed so that an upper limit value and a lower limit value are provided as the allowable movement speed and when the movement speed is larger than the upper limit value of the allowable movement speed, a brake is locked and when the movement speed is smaller than the lower limit value of the allowable movement speed, the brake is unlocked and when the movement speed is between the upper limit value and the lower limit value of the allowable movement speed, processing of the previous time is continued.

9. A robot comprising:

a driving apparatus for moving and driving a robot arm, a position detector for detecting a position of the robot arm, a brake apparatus for maintaining a stationary attitude of the robot arm, and an unlocking switch for stopping servo control and unlocking the brake apparatus, characterized in that it is constructed so that when a command from the unlocking switch is given, a movement amount of a work point of the arm top obtained by a present position, a position change amount and elapsed time from the position detector indicating a length of the arm and its attitude is compared with an allowable movement amount preset and when the movement amount is larger than the allowable movement amount, a brake is locked and when the movement amount is smaller than the allowable movement amount, the brake is unlocked.

10. A robot as defined in any of claims 2, 4, 6 and 9, characterized in that it is constructed so that an upper limit value and a lower limit value are provided as the allowable movement amount and when the movement amount is larger than the upper limit value of the allowable movement amount, a brake is locked and when the movement amount is smaller than the lower limit value of the allowable movement amount, the brake is unlocked and when the movement amount is between the upper limit value and the lower limit value of the allowable movement amount, processing of the previous time is continued.

11. A robot comprising:

a driving apparatus for moving and driving a robot arm, a position detector for detecting a position of the robot arm, a brake apparatus for maintaining a stationary attitude of the robot arm, and an unlocking switch for stopping servo control and unlocking the brake apparatus, characterized in that it is constructed so that brake unlocking time and brake locking time according to a position and a load condition of the robot arm are previously stored and the brake unlocking time and the brake locking time stored are read out of the present position and the preset load condition of the robot arm and a brake is unlocked based on the brake unlocking time read out and the brake is locked based on the brake locking time read out.

* * * * *